(12) United States Patent
Schnee et al.

(10) Patent No.: US 12,548,423 B2
(45) Date of Patent: Feb. 10, 2026

(54) METHOD AND DEVICE FOR DETECTING A FALL OF A MOBILE USER TERMINAL

(71) Applicant: Robert Bosch GmbH, Stuttgart (DE)

(72) Inventors: Jan Schnee, Weil im Schoenbuch (DE); Juergen Stegmaier, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 204 days.

(21) Appl. No.: 17/795,477

(22) PCT Filed: Jan. 19, 2021

(86) PCT No.: PCT/EP2021/051028
§ 371 (c)(1),
(2) Date: Jul. 26, 2022

(87) PCT Pub. No.: WO2021/151723
PCT Pub. Date: Aug. 5, 2021

(65) Prior Publication Data
US 2023/0086000 A1     Mar. 23, 2023

(30) Foreign Application Priority Data
Jan. 31, 2020  (DE) .................... 10 2020 201 222.9

(51) Int. Cl.
*G08B 21/04* (2006.01)
*G01P 7/00* (2006.01)
(Continued)

(52) U.S. Cl.
CPC .............. *G08B 21/043* (2013.01); *G01P 7/00* (2013.01); *G01P 13/00* (2013.01); *G01P 15/02* (2013.01);
(Continued)

(58) Field of Classification Search
CPC .. G01P 13/00; G01P 7/00; G01P 15/02; G01P 15/04; G01P 15/08; G01P 15/0888; G01P 15/18; G08B 21/043; G08B 21/0461
See application file for complete search history.

(56) References Cited

U.S. PATENT DOCUMENTS

2008/0234935 A1    9/2008   Wolf et al.
2008/0238056 A1*  10/2008   Kobayashi .......... B60R 21/0132
                                                            280/735
(Continued)

FOREIGN PATENT DOCUMENTS

CN    203025907 U    6/2013
CN    108109336 A    6/2018
(Continued)

OTHER PUBLICATIONS

International Search Report for PCT/EP2021/051028, Issued Apr. 26, 2021.

*Primary Examiner* — Benjamin R Schmitt
(74) *Attorney, Agent, or Firm* — NORTON ROSE FULBRIGHT US LLP

(57) ABSTRACT

A method described and device to rapidly detect the accident-related removal of a mobile user terminal from a holder and to generate corresponding information which characterizes the fall or crash related to the accident. Rotation-rate sensor variables and acceleration variables of the mobile user terminal are acquired. A rotation or twisting of the mobile user terminal is detected in that the currently acquired and/or integrated rotation-rate sensor variables are compared to past values and/or threshold values. A movement of the mobile user terminal is detected on the basis of the currently acquired and/or integrated acceleration variables. A comparison with past values and/or threshold values may optionally also be carried out. The determination of an in particular accident-related crash of the vehicle and/or the (Continued)

fall of the mobile user terminal out of the holder then takes place due to the detected rotation and the detected movement.

12 Claims, 3 Drawing Sheets

(51) Int. Cl.
  *G01P 13/00* (2006.01)
  *G01P 15/02* (2013.01)
  *G01P 15/04* (2006.01)
  *G01P 15/08* (2006.01)
  *G01P 15/18* (2013.01)

(52) U.S. Cl.
  CPC .............. *G01P 15/04* (2013.01); *G01P 15/08* (2013.01); *G01P 15/0888* (2013.01); *G01P 15/18* (2013.01)

(56) References Cited

U.S. PATENT DOCUMENTS

| | | | |
|---|---|---|---|
| 2013/0120147 A1* | 5/2013 | Narasimhan | G08B 21/0446 73/507 |
| 2015/0164438 A1 | 6/2015 | Halperin et al. | |
| 2019/0239027 A1 | 8/2019 | Chisaka et al. | |
| 2019/0347922 A1* | 11/2019 | Burton | G08B 21/043 |

FOREIGN PATENT DOCUMENTS

| | | |
|---|---|---|
| CN | 110382339 A | 10/2019 |
| EP | 3173796 A1 | 5/2017 |
| EP | 3572292 A1 | 11/2019 |

\* cited by examiner

METHOD AND DEVICE FOR DETECTING A FALL OF A MOBILE USER TERMINAL

FIELD

The present invention relates to a method and a device for monitoring and detecting the fall or drop of a mobile user terminal, in particular a user terminal that drops out of a holder on a vehicle.

BACKGROUND INFORMATION

The use of mobile user terminals and especially smartphones for different application areas outside of telephony has markedly increased over the past years. For example, electric bicycles are already controllable with the aid of smartphones carried along or positioned on the handlebars.

To protect the electronics of mobile user terminals in the event of a fall or crash, many such devices already have methods to detect a freefall in order to protect sensitive components, e.g., by switching these components to a currentless state. However, such methods essentially focus on detecting the direct freefall if the mobile user terminals drop out of the hand of the user while being used.

If such a mobile user terminal is then mounted on a vehicle such as on the handlebars of a two-wheeled vehicle, the detection of a freefall is often not helpful in detecting accidents of the two-wheeled vehicle. For example, if the mobile user terminal is flung out of the holder on the two-wheeled vehicle, a (flying) movement is to be expected that exhibits an essential freefall only in a later phase.

Therefore, an object of the present invention is to provide a method and a device that more rapidly detect a fall or crash of a mobile user terminal as a function of further marginal conditions and in other possible use situations.

SUMMARY

A method and a device executing this method according to the present invention are designed to rapidly detect the accident-related removal of a mobile user terminal from a holder and to generate corresponding information which characterizes the fall or crash in connection with the accident.

To realize the method according to an example embodiment of the present invention, the present invention, rotation-rate sensor variables and acceleration sensor variables of the mobile user terminal are acquired. A rotation or twisting of the mobile user terminal is detected in that the currently acquired and/or integrated rotation-rate sensor variables are compared with past values and/or threshold values. In a further step, a movement of the mobile user terminal is detected on the basis of the instantaneously acquired and/or integrated acceleration variables. Here, too, a comparison with past values and/or threshold values is optionally able to be carried out. The determination of an in particular accident-related crash of the vehicle and/or the drop of the mobile user terminal out of the holder then is made on the basis of the detected rotation and the detected movement. Here, the speed and/or the magnitude of the movement may optionally also play a role in ultimately generating fall detection information.

Since no normal, downward-directed fall takes place when the mobile user terminal, e.g., the smartphone, is flung out of the holder, the fall situation and thus the accident are detectable more rapidly. In comparison with a simple fall detection, the special consideration of the rotation when detecting the crash or fall of the mobile user terminal provides the possibility of detecting the special situation in an accident of a two-wheeled vehicle. Via the rapidity of the rotation and the movement of the mobile user terminal out of the holder, a classification of the crash is furthermore able to be performed, which may be useful for the further measures, especially emergency calls for help.

In a further development of the present invention, the rotation-rate sensor variables and/or the acceleration variables are already acquired prior to the accident to be detected or the crash or fall. From this, a movement plane is able to be derived in which the vehicle or the two-wheeled vehicle is moving. Both a longitudinal direction x is able to be identified in which the vehicle is essentially moving forward, and also a transverse direction y as a lateral movement direction, which can be observed during cornering or turning operations, for example. By detecting the regular movement of the mobile user terminal in the holder on the vehicle or the two-wheeled vehicle, an atypical deviation especially in the longitudinal direction and/or transverse direction may be an indication of, and thus a trigger for, detecting an accident as a function of the mobile user terminal being flung out of the holder. It may optionally be provided that especially the detection of an atypical rotation about the vertical axis z and/or an atypical movement of the mobile user terminal in the z-direction likewise implies/imply a crash or fall and may thus lead to the generation of fall information.

The detection of the rotation presents itself in a particularly advantageous manner if the method according to the present invention integrates the rotation-rate variable in at least one direction in space and thereby also takes a temporal aspect of the rotation or turning into account. Thereafter, such a slow rotation is able to be distinguished from a rapid rotation in that the integrated rotation variable thus obtained is compared with a corresponding first threshold value. In this way, a minimum rate of rotation may be connected with the first threshold value, which must be attained for a detection of the fall or for the detection of a related accident of the vehicle. In addition, a classification of the accident is possible by considering the rate of rotation or yaw rate, e.g., in that multiple first threshold values are used with which the in particular integrated rotation variable is compared.

To detect the fall of the mobile user terminal or to detect the mobile user terminal being flung out of its holder, an example embodiment of the present invention provides for a detection of the movement of the mobile user terminal as a function of the acquired acceleration variables. In this way, it may be assumed in a suddenly occurring acceleration that the cause is an unintended removal of the mobile user terminal from the holder, especially if this acceleration does not take place in the driving direction or longitudinal direction of the vehicle and/or has atypical magnitudes that do not occur during a normal driving operation. The currently acquired or integrated acceleration variable is able to be compared with one or more threshold value(s) for this purpose.

In one special example embodiment of the present invention, it is provided to form the acceleration variance in all three directions in space and to compare the value obtained thereby to a second threshold value. If this reveals that the entire acceleration variance within a predefined time period, e.g., within 0.1 s, exceeds the second threshold value, then it may be assumed that a sudden acceleration has taken place that is connected to the mobile user terminal being flung out of the holder.

As also in the detection of the rotation or twisting with the aid of the rotation-rate sensor variables, the spatial acceleration variables in relation to the movement plane of the vehicle or two-wheeled vehicle are also able to be taken into consideration when detecting the movement of the mobile user terminal.

To detect the movement plane of the vehicle or two-wheeled vehicle, which at the same time also represents the movement plane of the mobile user terminal, it is possible to consider the rotation-rate sensor variables and/or the acceleration variables of the movement of the vehicle prior to a possible crash or accident of the vehicle. To detect the rotation or twisting or the movement of the mobile user terminal, the corresponding components in the longitudinal or transverse direction may subsequently be utilized. However, especially also the corresponding directional components in the direction of the vertical axis z can be used as an alternative since this movement direction would cause only slight changes in the corresponding sensor variable or its components during a normal driving activity of the vehicle.

Starting with the detection of the crash or the fall of the vehicle or the mobile user terminal being flung out of its holder, the method according to an example is able to generate a classification of the fall information. For example, in an especially distinctive rotation or rapid movement, an abrupt crash of the vehicle or two-wheeled vehicle may be assumed. To summon corresponding assistance, it may therefore be provided that the method establishes a radio link to an emergency based on the generated fall information or the severity of the accident identified by the classification. In the process, details regarding the accident may possibly be transmitted as well, such as GPS data or other available information.

Additional advantages result from the following description of exemplary embodiments and the figures.

DETAILED DESCRIPTION OF EXAMPLE EMBODIMENTS

A two-wheeled vehicle in the form of a bicycle 10 is used as the basis for describing the present invention, but other vehicles such as electric bicycles, motorcycles, e-scooters, baby carriages, scooters or also motor vehicles may also be equipped with the present invention. In this particular case of vehicle 10, a smartphone 20 is provided as a mobile user terminal, which is mounted on the handlebar of bicycle 10. For example, smartphone 20 is used as a navigation instrument and/or as a display of the driving dynamics parameters. Smartphone 20 makes use of the sensor values supplied by the sensors provided in smartphone 20 to carry out the method according to the present invention. As a rule, the bicycle in essence moves forward on the road in longitudinal direction x. Through turning and cornering operations, the movement plane is defined by an additional lateral transverse direction y. For example, a movement in the direction of vertical axis z takes place within the scope of uphill and downhill driving. Further movements that may have an effect in the direction of the vertical axis are generated by rotations in the direction of the x-axis or by uneven road surfaces. All of these movements in the direction of the d-axis are able to be distinguished from one another by characteristic orders of magnitude of the rate of change, i.e., dz/dt. Driving uphill or downhill, for instance, is related to a longer time constant than a lateral tip over of the vehicle basically along the x-axis. An unevenness of roads, on the other hand, is characterized by very small movements in the z-direction within a short period of time.

The sensors inside smartphone 20 are aligned to their own coordinate system. The mounting of the smartphone on the handlebar thus calls for a recalibration with regard to the alignment to the coordinate system specified by the movement. For example, the spatially resolved sensor variables of the rotation-rate sensor or the acceleration sensor in the smartphone may be used to acquire this defined coordinate system during a normal driving operation. Possible deviations, e.g., in the z-direction, that exceed a certain measure, in particular with regard to the time dependency, may thus be evaluated as an indication of a crash of the bicycle. In this context, as previously mentioned, the order of magnitude at which the change in rate dz/dt is present in the direction of the z-axis is able to be considered in order to utilize this movement for a crash detection. It may be provided, for example, that the change in the z-direction must be present for a sufficient length of time to allow the movement to be distinguished from a rough pavement, for instance.

Figure 1:
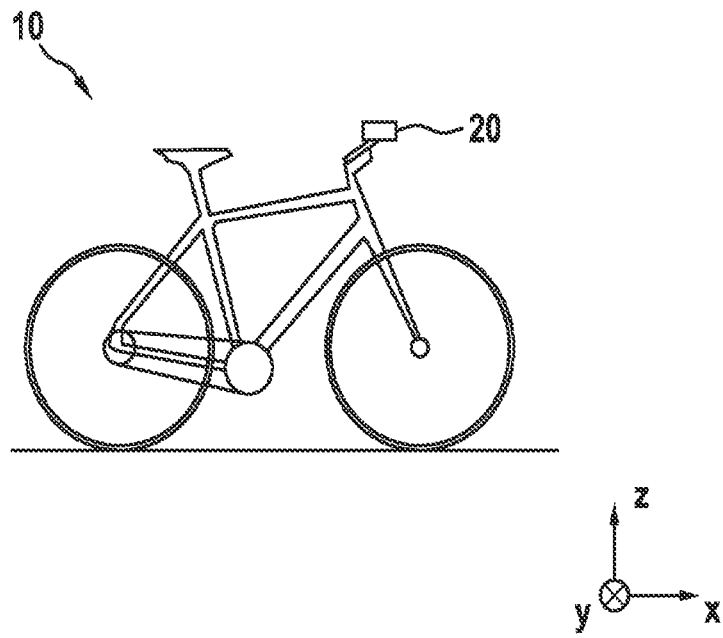
FIG. 1 schematically shows a two-wheeled vehicle having a mobile user terminal and also a coordinate system in which the two-wheeled vehicle is moving during a normal driving operation.
Figure 2:
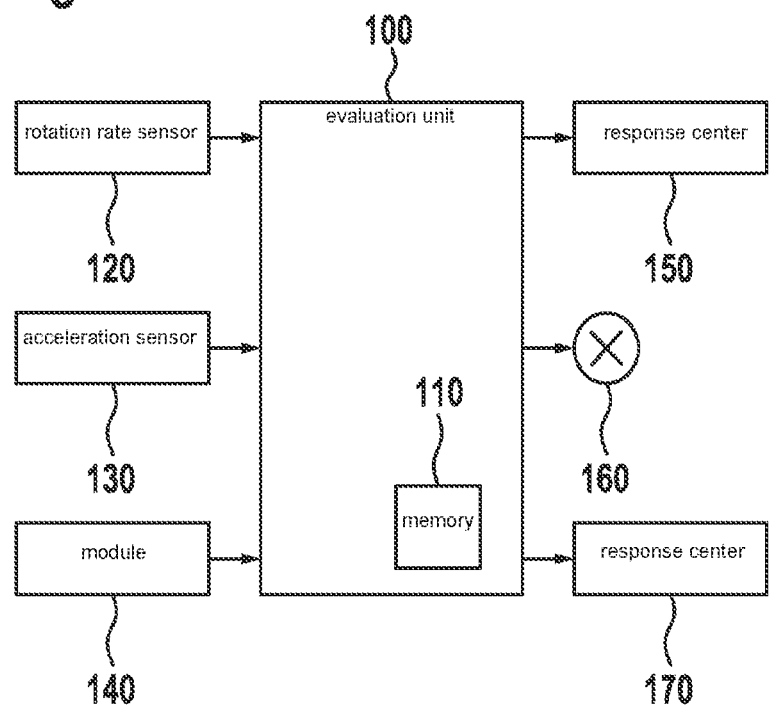
FIG. 2 shows a block circuit diagram of a possible realization of a device according to an example embodiment of the present invention.

In FIG. 2, a smartphone 20 is schematically illustrated, which has an evaluation unit 100. Evaluation unit 100 includes a memory 110 in which different threshold values are able to be stored. In addition, evaluation unit 100 acquires the spatially resolved sensor variables of a rotation-rate sensor 120 and an acceleration sensor 130. Evaluation device 100 is furthermore also able to acquire further sensor variables provided the smartphone includes corresponding sensors or the sensor variables can be read in by external sensors that are mounted on the two-wheeled vehicle, for example. Possible in this context, for instance, is that an inclination sensor supplies corresponding sensor variables for the ascent of the ride with the bicycle, in particular its rate of climb. Such additional sensor variables are able to increase the accuracy of the subsequent detection of a crash or an accident by making the base data more precise. It may optionally also be provided that evaluation unit 100 is explicitly informed of an occurred crash by a special module 140 via a further connection. In this case, evaluation unit 100 is able to derive an even better classification of the accident based on the received sensor variables and forward a message to an emergency response center 170, as the case may be. Without this additional crash information by module 140, the method according to the present invention, which is carried out in evaluation unit 100, is able to detect an accident, a fall or also only smartphone 20 being flung out of its holder on the handlebar based on the rotation-rate sensor variables and the acceleration variables and to generate corresponding fall information. This fall information is then able to be forwarded to corresponding response centers 150 or 170 or also be displayed on a display 160. For instance, it is possible that a general distress call 150 is output or a special emergency response center 170 is contacted.

Figure 3:
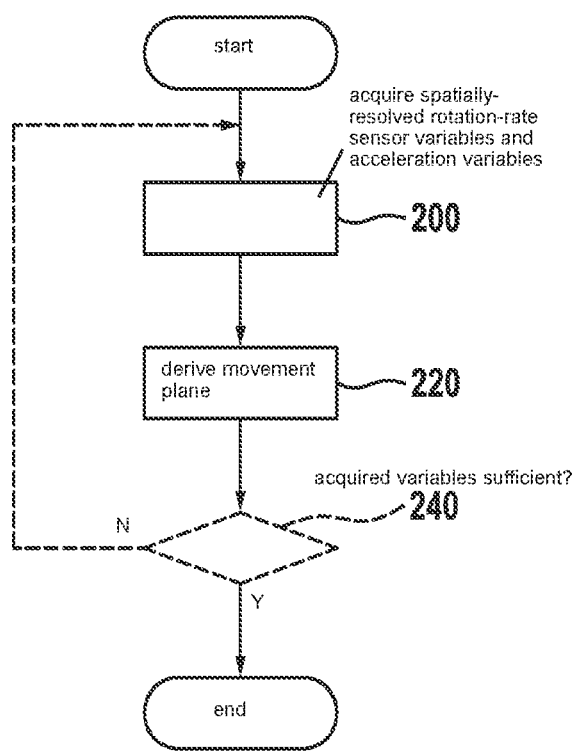
FIGS. 3 and 4 show flow diagrams that describe possible exemplary embodiments of the methods according to the present invention.

Based on the flow diagram of FIG. 3, an optional derivation of the coordinate system is to be described which takes the movement of the bicycle on the road into account. To this end, in a first step 200, the spatially resolved rotation-rate sensor variables and the acceleration variables during a normal driving activity of the vehicle or the two-wheeled vehicle are acquired at the outset. Next, in step 220, a movement plane in the preferred x/y-direction is derived from the sensor variables acquired in this way. Based on these direction definitions, the calibration of the coordinate system of the smartphone is able to be carried out. Alternatively or additionally, the definition of the movement plane makes it possible to detect whether smartphone 20 is moving out of this movement plane, for instance by being flung out of the holder on the handlebar.

In a further step 240, it is optionally possible to check whether the acquired sensor variables are sufficient to derive a movement plane in the x/y-direction. If that is not the case, for instance because the bicycle is currently driving uphill or the sensor data are not unambiguous or too fuzzy, then it is possible to start a new acquisition of the sensor data in step 200.

Figure 4:
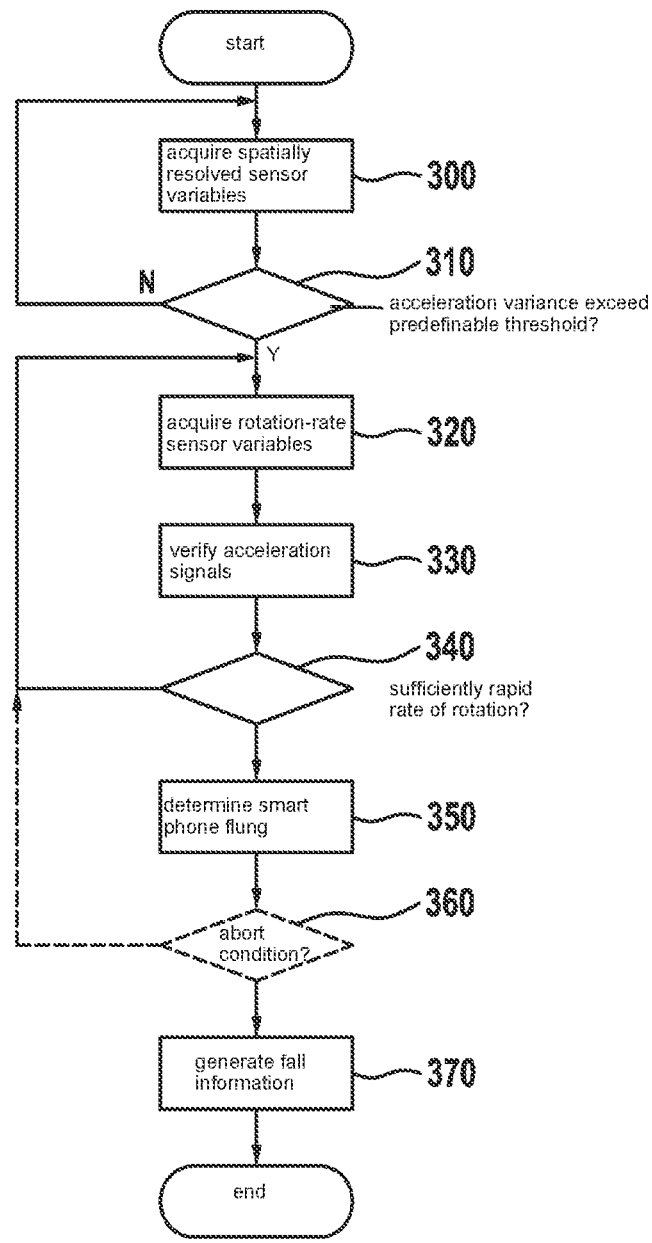

The method according to the present invention for detecting a crash of the bicycle or a fall of the smartphone from its holder will be described in the following text based on the flow diagram of FIG. 4. To begin with, spatially resolved sensor variables for the rate of rotation and the acceleration are acquired in a first step 300. To this end, it is particularly provided that the method is running on a smartphone which is equipped with the appropriate sensors for the rate of rotation and acceleration and has the direction-dependent resolution required for this purpose. In order to obtain robust and unambiguous sensor values, it may be provided to acquire a series of acceleration variables, e.g., via ten samples at a sampling rate of 100 Hz. In the next step 310, the sum of the acceleration variance is formed from the thus acquired acceleration variables according to $$\sigma^2_{ax,ay,az} = \sigma^2_{ax} + \sigma^2_{ay} + \sigma^2_{az}$$

If this acceleration variance $\sigma^2_{ax, ay, az}$ exceeds a predefinable third threshold value $SW_3$, then an accident, an impact or a collision may be inferred which represents the cause of the smartphone being flung out of the holder and thus causes the acceleration. If the acceleration variance is lower than the third threshold value $SW_3$, then it is possible to cycle through the method again with step 300 or the method may be ended. In the following step 320, the rotation-rate sensor signals are acquired, at least in longitudinal direction x and transverse direction y in relation to the movement plane of the vehicle or its vehicle coordinate system. The rotation-rate sensor signals in the direction of vertical axis z, in particular their rate of change, may optionally be disregarded in an effort to avoid any faulty triggering caused by rapid steering rotations. The rotation-rate sensor variables obtained in this way are integrated in next step 330 in order to derive the rotation or the rotary movement of the smartphone therefrom. In step 330, a verification of the acceleration signals may optionally also be performed. In addition to the detected brief increase in the acceleration, a freefall is able to be detected, for instance from the instantaneous acceleration variables additionally acquired in step 320. For this purpose, for example, the acceleration 2-norm or also the vector norm of the acceleration is able to be formed to detect whether the smartphone is experiencing a fall movement. This variable may be compared with a second threshold value $SW_2$ (e.g., 100 mg in 100 ms) in order to derive the fall movement therefrom. In the following step 340, based on the rotation-rate sensor variables, integrated individually or jointly, in comparison with corresponding first threshold values $SW_{1,x}$ or $SW_{1,y}$ (in relation to the individual directional components) and $SW_{1,xy}$ (in relation to the direction vector in the xy-direction), it can then be determined whether a sufficiently rapid rotation of the smartphone is present to detect it being flung out of the holder and thus to detect a meaningful crash or accident of the bicycle. In addition, the detection of the falling smartphone may be used in step 340 to verify the process. It is optionally also possible to utilize a combination of both conditions, that is, the presence of a corresponding rotation and a freefall, it being possible in this case to dynamically link both individual features. It may be provided, for instance, that given a low acceleration variance, a smaller rotation or twisting must be observed in order to detect a crash. The same applies to the reverse case in which a large rotation requires only a low acceleration variance in order to detect that a smartphone has been flung out of the holder. If the corresponding conditions are not satisfied, that is, if an insufficient rotation is detected or the smartphone is not involved in a falling movement, then the method may be cycled through again with step 320. In the other case, it will be determined in step 350 that the rotation or twisting of the smartphone is of sufficient magnitude (e.g., $\Delta\gamma > 360°$ within 1 s, such as at a sampling rate of the acquisition of the sensor variables of 100 Hz), so that it may be assumed that the smartphone was flung out of the holder. In the optional following step 360, an abort condition is able to be defined. Here, based on the newly acquired instantaneous acceleration signal, it is detected whether the smartphone has come to rest after it was flung out of the holder. If this is not the case, the method may be cycled through again with step 320. This renewed cycling makes it possible to detect the severity of the collision or the accident by detecting a longer fall of the smartphone. In the other case, fall information is generated in last step 370. This fall information is able to be transmitted as a notification to an emergency response service. If a classification of the crash is performed, e.g., by the use of different threshold values for the rotation or acceleration, then the severity of the accident can be inferred as well. In this case, the fall information may include a classification so that different emergency measures are carried out depending on the severity of the accident. These may range from a simple notification up to an emergency call including the forwarding of known parameters with regard to the accident.

It may optionally also be provided that the method detects a crash by checking an electrical contact in the holder. If such separate information available to the method, then the method is able to specialize in the classification of the accident.

What is claimed is:

1. A method for detecting a fall of a mobile user terminal from its holder, wherein the mobile user terminal is mounted on a vehicle, the method comprising the following steps:
   acquiring rotation-rate sensor variables of the mobile user terminal;
   acquiring acceleration variables of the mobile user terminal;
   detecting a rotation of the mobile user terminal as a function of the rotation-rate sensor variables;
   detecting a movement of the mobile user terminal as a function of the acceleration variables; and
   generating fall information, indicative of an ejection of the mobile user terminal from the holder, as a function of the detected rotation and the detected movement, wherein the fall information is used to detect the fall of the mobile user terminal from the holder,
   wherein the fall information is generated in response to detecting a combination of a rotation characteristic of being flung from the holder and a movement inconsistent with a normal operation of the vehicle.

2. The method as recited in claim 1, further comprising:
detecting a movement plane of the vehicle as a function of the acquired rotation-rate sensor variables or the acquired acceleration sensor variables, the movement plane being made up of a longitudinal direction as a preferred movement direction, and a transverse direction as a lateral movement direction; and
detecting the rotation as a function of the rotation-rate sensor variables in the longitudinal and the transverse direction.

3. The method as recited in claim 2, further comprising:
forming at least one rotation variable as a function of an integration of the rotation-rate sensor variables in at least one direction in space; and
detecting the rotation as a function of an exceeding of a first threshold value by the rotation variable
wherein for each direction of the movement plane, performing:
forming a respective rotation variable and assigning to the respective rotation variable the first threshold value, and
detecting the rotation as a function of an exceeding of at least one first threshold value assigned to the respective rotation variable by the respective rotation variable.

4. The method as recited in claim 1, further comprising:
forming at least one rotation variable as a function of an integration of the rotation-rate sensor variables in at least one direction in space; and
detecting the rotation as a function of an exceeding of a first threshold value by the rotation variable.

5. The method as recited in claim 4, further comprising:
detecting the movement as a function of an exceeding of a second threshold value by the acceleration variable.

6. The method as recited in claim 5, further comprising:
forming an acceleration variance from a multitude of directionally resolved acceleration variables; and
detecting the movement as a function of the exceeding of a third threshold value by the acceleration variance.

7. The method as recited in claim 6, the method further comprising:
deriving fourth threshold values from the acquired rotation-rate sensor variables and/or acceleration variables in the movement of the vehicle in the movement plane, which are not exceeded during the movement of the vehicle in the movement plane, and
detecting the rotation and/or the movement of the mobile user terminal as a function of an exceeding of at least one fourth threshold value by a currently acquired or integrated rotation-rate sensor variables and/or acceleration variables in the longitudinal and the transverse direction.

8. The method as recited in claim 4, further comprising:
acquiring the rotation-rate sensor variables and/or the acceleration variables during the movement of the vehicle in the movement plane; and
detecting the rotation and/or the movement of the mobile user terminal as a function of a deviation of the rotation-rate sensor variables and/or acceleration variables in the longitudinal direction and the transverse direction of a movement of the vehicle in the movement plane.

9. The method as recited in claim 1, further comprising:
detecting a movement plane of the vehicle as a function of the rotation-rate sensor variables or the acceleration variables, the movement plane being made up of a longitudinal direction as a preferred movement direction and a transverse direction as a lateral movement direction; and
detecting the movement as a function of the acceleration variables in the longitudinal and the transverse direction.

10. The method as recited in claim 1, further comprising:
establishing a radio link to an emergency call as a function of the generated fall information.

11. A mobile user terminal for mounting on or in a holder on a two-wheeled vehicle, the mobile user terminal comprising:
an evaluation unit configured to:
acquire rotation-rate sensor variables of the mobile user terminal;
acquire acceleration variables of the mobile user terminal;
detect a rotation of the mobile user terminal as a function of the rotation-rate sensor variables;
detect a movement of the mobile user terminal as a function of the acceleration variables, and
generate fall information indicative of an ejection of the mobile user terminal from the holder,
wherein the evaluation unit is configured to generate the fall information in response to detecting a combination of a rotation characteristic of being flung from the holder and a movement inconsistent with a normal operation of the vehicle.

12. The mobile user terminal as recited in claim 11, further comprising:
a transmitter unit, which establishes a radio link to an emergency call as a function of the generated fall information.

* * * * *